US007050159B2

(12) United States Patent
Hibari

(10) Patent No.: US 7,050,159 B2
(45) Date of Patent: May 23, 2006

(54) COIN-TYPE DETERMINING DEVICE

(75) Inventor: Eiko Hibari, Kazo (JP)

(73) Assignee: Laurel Bank Machines Co., Ltd. (JP)

( * ) Notice: Subject to any disclaimer, the term of this patent is extended or adjusted under 35 U.S.C. 154(b) by 91 days.

(21) Appl. No.: 10/819,193

(22) Filed: Apr. 7, 2004

(65) Prior Publication Data

US 2004/0187595 A1 Sep. 30, 2004

Related U.S. Application Data

(62) Division of application No. 09/735,507, filed on Dec. 14, 2000, now Pat. No. 6,785,412.

(30) Foreign Application Priority Data

Dec. 15, 1999 (JP) ................................ 11-356716
Dec. 15, 1999 (JP) ................................ 11-356717

(51) Int. Cl.
*G06K 9/74* (2006.01)
*G06K 9/00* (2006.01)

(52) U.S. Cl. ......................... 356/71; 382/136; 382/138

(58) Field of Classification Search ..................... None
See application file for complete search history.

(56) References Cited

U.S. PATENT DOCUMENTS 4,089,400 A 5/1978 Gregory, Jr.
4,172,222 A 10/1979 Eglise
4,371,071 A 2/1983 Abedor
5,236,074 A 8/1993 Gotaas
5,283,422 A 2/1994 Storch et al.
5,684,597 A * 11/1997 Hossfield et al. ........... 356/635
6,142,285 A 11/2000 Panzeri

FOREIGN PATENT DOCUMENTS

| | | |
|---|---|---|
| DE | 33 35 347 | 4/1985 |
| EP | 0 416 932 A1 | 3/1991 |
| GB | 2 212 313 A | 7/1989 |
| GB | 2 340 980 | 3/2000 |
| JP | 03-044770 | 4/1991 |
| JP | 10-11629 | 1/1998 |
| KR | 172146 | 3/1999 |

* cited by examiner

*Primary Examiner*—Michael P. Stafira
(74) *Attorney, Agent, or Firm*—Nixon & Vanderhye PC

(57) ABSTRACT

The coin-type determining device, for determining the presence or absence of inclined notches formed on the circumferential surface of the coin transferred through a coin transfer path, comprises: a plurality of notch detecting devices provided separately from each other with respect to an axis of the coin; a determining device for determining the presence or absence of inclined notches based on the difference between the notch detection results by the notch detecting devices.

3 Claims, 2 Drawing Sheets

COIN-TYPE DETERMINING DEVICE

This application is a division of application Ser. No. 09/735,507, filed Dec. 14, 2000 now U.S. Pat. No. 6,785,412, the entire content of each of which is hereby incorporated by reference in this application.

BACKGROUND OF THE INVENTION

1. Field of the Invention

The present invention relates to a coin-type determining device for determining the type of a coin by detecting whether a coin has a specific shape or not.

2. Description of the Related Art

A conventional coin-type determining device is disclosed in Japanese Unexamined Utility Model Application, First Publication No. Hei 3-44770. The device emits slit-shaped light, which is long in the direction of the thickness of a coin, onto the circumferential surface of the coin, and receives the reflected light. Thus, the device determines the type of the irregular shapes formed on the side of the coin, for example, the notches of a 500-yen coin, or the grooves (hereinafter referred to as notches) of a 500-won coin in the direction of its thickness.

Since there are various designs of coins, inclined notches, which are formed on the circumferential surface of the coin and which are inclined with respect to the axis of the coin, will be employed on 500-yen coins in the future. However, the conventional coin-type determining devices cannot effectively detect the inclined notches.

BRIEF SUMMARY OF THE INVENTION

It is therefore an object of the present invention to provide a coin-type determining device with a simple configuration which effectively determines the presence or absence of the inclined notches.

In a first aspect of the present invention, a coin-type determining device for determining the presence or absence of inclined notches formed on the circumferential surface of a coin transferred through a coin transfer path, comprises: a plurality of notch detecting devices provided separately from each other with respect to an axis of the coin; and a determining device for determining the presence or absence of inclined notches, based on the difference between the notch detection results by the notch detecting devices.

Because the presence or absence of inclined notches is determined, based on the difference between the notch detection results by the notch detecting devices provided separately from each other with respect to an axis of the coin, the presence or absence of the notches can be effectively detected using a simple configuration.

In a second aspect of the present invention, the coin-type determining device further comprises a light emitting device for emitting light onto the circumferential surface of a coin. Each of the notch detecting devices comprises a light receiving device for receiving light which has been emitted from the light emitting device and has been reflected from the circumferential surface of the coin.

The light emitting device emits light onto the circumferential surface of the coin. The emitted light is reflected from the circumferential surface of the coin, and is received by the light receiving devices provided separately from each other with respect to the axis of the coin. The determining device determines the presence or absence of inclined notches, based on the difference between the notch detection results by the notch detecting devices. Thus, because the light emitting device is provided and the notch detecting devices are the light receiving devices, the presence or absence of the notches can be effectively detected using a simple configuration.

In a third aspect of the present invention, a plurality of pairs of the light receiving devices are provided at different positions with respect to the axis of the coin, and are provided at neighboring positions with respect to the transfer direction. The determining device determines the presence or absence of inclined notches based on the difference between detection signals output from the light receiving devices neighbor each other in the transfer direction of the coin.

Light receiving sensor pairs are provided at different positions with respect to the axis of the coin, and at neighboring positions with respect to the transfer direction. The light is reflected from the regions, neighboring in the transfer direction, on the circumferential surface of the coin, and is separately detected by the light receiving sensors neighboring each other in the transfer direction of the coin. The determining device calculates the difference between the detection signals from the light receiving sensors, and calculates the difference between the detection signals. Therefore, when concave portions and convex portions neighbor each other in the transfer direction, that is, when there are notches, differences between the received signals can be obtained.

In a fourth aspect of the present invention, the coin-type determining device for determining the presence or absence of inclined notches formed on the circumferential surface of a coin transferred through a coin transfer path, comprises: a light emitting device for emitting light onto the circumferential surface of the coin; a light receiving device disposed in the direction of regular reflection of the light reflected from the notch; and a determining device for determining the presence or absence of inclined notches, based on the quantity of light received by the light receiving device.

When the light emitting device emits the light onto the circumferential surface of the coin transferred through the coin transfer path, the quantity of light received by the light receiving device, which is disposed in the direction of regular reflection of the light reflected from the notch, depending on the presence or absence of inclined notches formed on the circumferential surface of the coin. The determining device determines the presence or absence of inclined notches, based on the quantity of light received by the light receiving device.

In a fifth aspect of the present invention, the light emitting device emits light onto the circumferential surface of the coin transferred through the coin transfer path through the light axis perpendicular to the axis of the coin.

Thus, the space required for the light emitting device, and the light receiving device can be minimized because the light emitting device emits light in the direction perpendicular to the axis of the coin.

DETAILED DESCRIPTION OF THE INVENTION

First Embodiment

The first embodiment of the coin-type determining device of the present invention will be explained with reference to FIGS. 1 and 2.

The coin-type determining device 1 of the first embodiment determines the presence or absence of inclined notches (inclined grooves) G on the circumferential surface of a coin C which is transferred along a coin transfer path 2. The inclined notches are inclined at a predetermined angle with respect to the axis X of the coin. As shown in FIG. 1, the coin-type determining device 1 comprises a light source 3 (light emitting device), and a plurality of (e.g., two) light receiving sensors 4 (notch detecting devices or light receiving devices). The light source 3 is provided outside the coin transfer path 2 for transferring the coin C in its radial direction (transfer direction Z) of the coin C, and emits light through a light axis L. The light axis L is in the horizontal plane through the center of the thickness of the coin C, and has an angle of 35 degrees with respect to the radial direction of the coin C in the plan view. The light receiving sensors 4, as shown in FIGS. 1 and 2, are provided outside the coin transfer path 2 in the direction X perpendicular to the transfer direction Z of the coin C, and are positioned at different positions on the axis of the coin C which is being transferred by the coin transfer path 2.

The coin transfer path 2 has a coin transfer device (not shown) for transferring the coin C while holding the coin C with belts (not shown) from the direction X of the axis, that is, from the direction of the thickness of the coin, to prevent the rotation of the coin C. The coin transfer device linearly transfers the coin C in the single radial direction Z.

The light source 3 is, for example, an LED.

The light receiving sensors 4 are, for example, photo diodes which output light receiving signals having amplitudes corresponding to the quantities of the received reflected light.

The light receiving sensors 4 are provided at similar positions with respect to the transfer direction Z of the coin C through the coin transfer path 2, and are provided within the thickness of the coins through the coin transfer path 2. The light receiving sensors 4 receive the light emitted from the light source 3 and reflected from the circumferential surface of the coin C.

Figure 1:
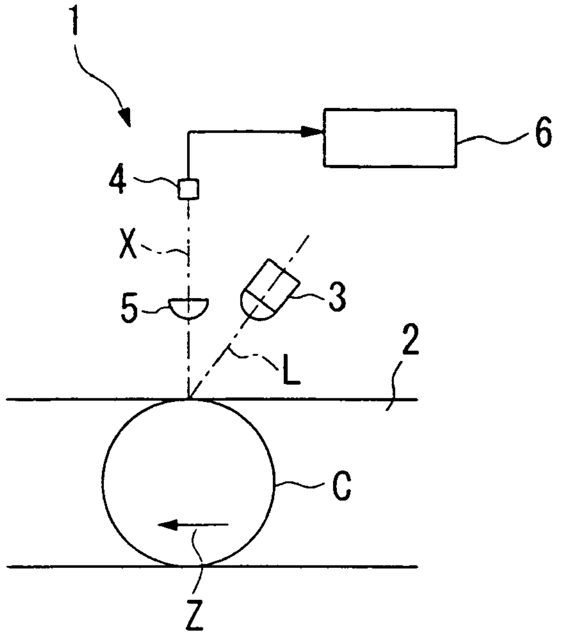
FIG. 1 is a plan view schematically showing the coin-type determining device of the first embodiment of the present invention.
Figure 2:
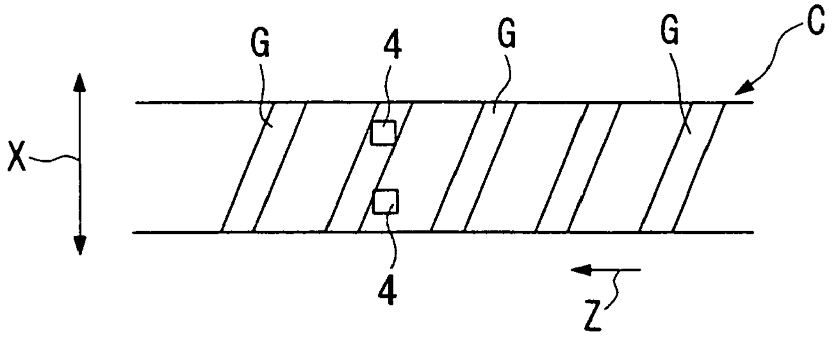
FIG. 2 is a side view showing a part of the construction of the coin-type determining device of the first embodiment of the present invention.

Referring to FIG. 1, the coin-type determining device 1 of the first embodiment comprises a lens 5 provided between the coin transfer path 2 and the light receiving sensors 4, and a determining device 6, connected to the light receiving sensors 4, for determining the presence or absence of the inclined notches G of the coin C, based on the detection signals from the light receiving sensors 4.

The determining device 6 determines the presence or absence of the inclined notches G of the coin C, based on the difference in phase between the notch detection results by the light receiving sensors 4.

Since the distance between the light receiving sensors 4 is fixed, the difference in phase between the notch detection results by the light receiving sensors 4 is uniquely determined when detecting the true coin having the notches inclined at the predetermined angle. When the difference in phase between the notch detection results by the light receiving sensors 4 is within a predetermined allowable range, the determining device 6 determines that the coin C is a true coin having the notches inclined at the predetermined angle. When the notches G are not detected, or when the difference in phase between the notch detection results is not within the allowable range, the determining device 6 determines that the coin C is a coin which does not have the notches, that is, a false coin.

Even when vertical parallel notches in the direction of the axis of the coin are detected, the distance between the light receiving sensors 4 is adjusted to prevent misdetection, so that the difference in phase between the notch detection results by the light receiving sensors 4 is within a predetermined allowable range.

The distance between the light receiving sensors 4 is decided based on the angle of the notches G of the true coin C. Thus, the difference in phase between the detections of the notches of the true coin C is set to a predetermined value, e.g., 180, 120, or 90 degrees. The arrangement for setting the predetermined difference in phase prevents misdetection caused by vertical notches.

According to the coin-type determining device 1 of the first embodiment, the determining device 6 detects the presence or absence of the inclined notches G, based on the difference in phase between the detections of the notches by the light receiving sensors 4 which are at different positions with respect to the direction of the axis X of the coin C. Therefore, the presence or absence of the notches G can be effectively detected with the simple configuration.

As the light source 3 is operated, the light is emitted onto the circumferential surface of the coin C in the radial direction perpendicular to the transfer direction Z. The emitted light is reflected from the circumferential surface of the coin C, and is received by the light receiving sensors 4 (e.g., two sensors) at different positions with respect to the axis X of the coin. Then, the determining device 6 detects the presence or absence of the inclined notches G, based on the difference in phase between the detections of the notches by the light receiving sensors 4.

Thus, the light source 3 is provided, and the light receiving sensors 4 for detecting the notches G is provided, thereby simplifying the construction of the device.

Second Embodiment

Figure 3:
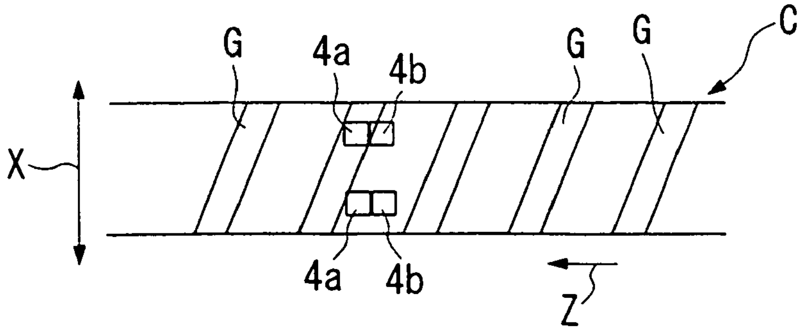
FIG. 3 is a side view showing a part of the construction of the coin-type determining device of the second embodiment of the present invention.

The coin-type determining device of the second embodiment will be explained with reference to FIG. 3, and mainly the differences with the first embodiment will be discussed. The same reference numbers are employed to designate like parts in the first embodiment, and a detailed description thereof is omitted.

The coin-type determining device 1 of the second embodiment has pairs of light receiving sensors which are provided at different positions with respect to the axis X of the coin C, and which are provided at similar positions in the transfer direction Z. That is, as shown in FIG. 3, the light receiving sensors 4*a* and 4*a* of one of the pairs are provided at different positions with respect to the axis X of the coin C, and are provided at similar positions in the transfer direction Z of the coin C through the coin transfer path 2. Further, the light receiving sensors 4*b* and 4*b* of the other pair are provided at different positions with respect to the axis X of the coin C, and are provided at similar positions in the transfer direction Z of the coin C through the coin transfer path 2. Thus, the light receiving sensor pair 4*a* and 4*a*, and the other pair 4*b* and 4*b* are at neighboring positions with respect to the transfer direction Z of the coin C through the coin transfer path 2. The light receiving sensors 4*a*, 4*a*, 4*b*, and 4*b* independently output detection signals. The light receiving sensors 4*a* and 4*b*, which are at similar positions with respect to the axis X, detect the light reflected from regions, neighboring each other in the transfer direction Z, on the circumferential surface of the coin C.

The determining device 6 determines the presence or absence of the inclined notches G of the coin C, based on the difference in the detection signals from the light receiving sensors 4*a* and 4*b* which neighbor each other in the transfer direction Z of the coin C.

The determining device 6 calculates the difference in the detection signals output from the light receiving sensors 4*a* and 4*b* which are at the different positions in the transfer direction Z of the coin C and which are at similar positions with respect to the axis X (vertical direction) of the coin C. Specifically, the upper light receiving sensors 4*a* and 4*b*, which are at the different positions in the transfer direction Z, detect light reflected from the regions, neighboring each other in the transfer direction Z, on the circumferential surface of the coin C. The determining device 6 determines the presence of notches G, based on the difference in the quantity of light reflected from the regions. Similarly, the lower light receiving sensors 4*a* and 4*b*, which are at different positions in the transfer direction Z, detect the light reflected from the regions, neighboring each other in the transfer direction Z, on the circumferential surface of the coin C. The determining device 6 determines the presence of the notches G based on the difference in the quantity of light reflected from the regions.

In the coin-type determining device 1 of the second embodiment, the light from the light source 3 is emitted onto the circumferential surface of the coin C with notches G which is being transferred through the coin transfer path 2. Then, the light reflected from the different regions (when a first region is dark, and a second region is bright) is detected by the upper light receiving sensors 4*a* and 4*b*. The determining device 6 differentially amplifies the signal indicating the difference in the quantity of light between the detection results. As the coin C is further moved so that the second region becomes dark and that the first region becomes bright, an output signal having codes which are the reverse of that signal is differentially amplified by the determining device 6. Thus, the determining device 6 obtains an alternating current whose sign alternately and regularly varies (between the negative sign and the positive sign). From the signals from the lower light receiving sensors 4*a* and 4*b*, the determining device 6 obtains similar alternating waves. Then, the determining device 6 determines the presence or absence of the notches G, based on the obtained data.

As described above, the pairs of light receiving sensors 4*a* and 4*a*, and 4*b* and 4*b* are provided at different positions with respect to the axis X of the coin C, and are provided at similar positions in the transfer direction Z. The light is reflected from the regions, neighboring each other in the transfer direction Z, on the circumferential surface of the coin C, and is detected by the light receiving sensors 4*a* and 4*b* neighboring each other with respect to the transfer direction Z of the coin C through the coin transfer path 2. The determining device 6 calculates the difference between the detection signals from the upper light receiving sensors 4*a* and 4*b*, and calculates the difference between the detection signals from the lower light receiving sensors 4*a* and 4*b*. Therefore, when a concave portion and a convex portion neighbor each other in the transfer direction Z, that is, when there are notches G, a difference between the received signals can be obtained.

Third Embodiment

Figure 4:
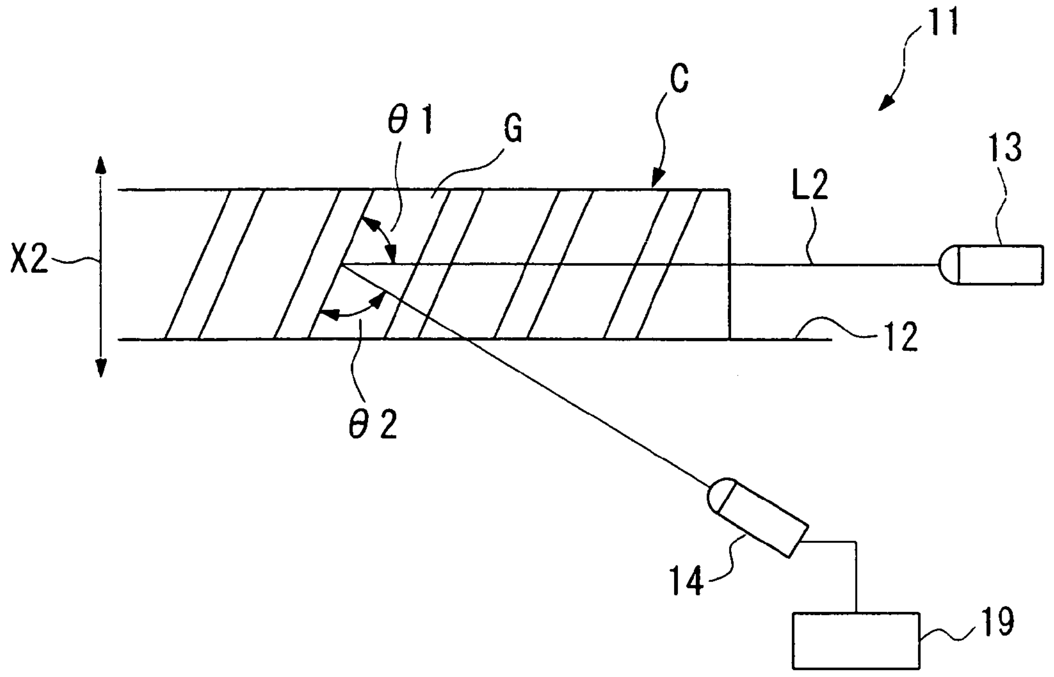
FIG. 4 is a plan view schematically showing the coin-type determining device of the third embodiment of the present invention.

The coin-type determining device of the third embodiment will be explained with reference to FIG. 4.

The coin-type determining device 11 of the embodiment determines the presence or absence of inclined notches G (inclined grooves) which are formed on the circumferential surface of the coin C transferred through the coin transfer path 12, and which are inclined at a predetermined angle with respect to an axis X2 of the coin C. As shown in FIG. 4, the coin-type determining device 11 is provided outside the coin transfer path 12 for transferring the coin C in its radial direction (in the vertical direction with respect to the plane in FIG. 4). The coin-type determining device 11 comprises a light source 13 (light emitting device) for emitting light onto the circumferential surface of the coin C which is being transferred through the coin transfer path 12, and a light receiving sensor 14 (light receiving device) provided in the direction of regular reflection of the light which has been emitted from the light source 13 and reflected from the notches G.

The coin transfer path 12 has a coin transfer device for holding the coin C with a belt (not shown) in the direction of the axis X2 of the coin C, and for transferring the coin C while preventing its rotation. The coin C is transferred linearly in a radial direction of the coin C.

The light source 13 is provided in the horizontal plane through the center of the thickness of the coin C. The light source 13 emits the light in a direction perpendicular to the axis X2 of the coin C (in a direction parallel to the upper and lower surfaces of the coin) through a light axis L2 which is perpendicular to the axis X2 of the coin C. The light source 13 is, for example, an LED.

The light receiving sensor 14 is provided in the direction of regular reflection of the light which has been emitted from the light source 13 and reflected from the inclined notches G. That is, the light receiving sensor 14 is provided in the direction of the reflected light, which has been emitted in the light axis L2 at an incidence angle θ1 with respect to the notches G, and which has been reflected at a reflection angle θ2 which is equal to and is symmetrical with θ1. The light receiving sensor 14 is separated from the coin C in a direction parallel to the axis X2 of the coin C. The distance between the light receiving sensor 14 and the coin C is minimized in consideration of the position of the light source 13. The light receiving sensor 14 is, for example, a photo diode which outputs a light receiving signal having an amplitude depending on the quantity of received reflected light.

The coin-type determining device 11 has a determining device 19 for determining the presence or absence of the inclined notches G on the coin C, based on the quantity of light received by the light receiving sensor 14.

The light source 13 emits the light onto the circumferential surface of the coin C which is being transferred through the coin transfer path 12. When there are notches G on the coin C, the light is properly reflected toward the light receiving sensor 14 (in the direction of the regular reflection), and the quantity of light received by the light receiving sensor 14 is increased. When the coin C has no inclined notch G (no notch, or notches with a different angle), the light is irregularly reflected, or is reflected in a different direction, and therefore the quantity of light received by the light receiving sensor 14 is decreased. The determining device 19 determines the presence or absence of the notches G of the coin C, based on the variation of the light. When the quantity of light (e.g., the peak value) received by the light receiving sensor 14 exceeds a predetermined threshold value, the determining device 19 determines that the coin C is a true coin with inclined notches G. When the quantity of light (e.g., the peak value) received by the light receiving sensor 14 is below a predetermined threshold value, the determining device 19 determines that the coin C is a false coin with no inclined notches G.

According to the coin-type determining device 11, the light source 13 emits the light onto the circumferential surface of the coin C which is being transferred through the coin transfer path 12. The light is received by the light receiving sensor 14 which is provided in the direction of the regular reflection of the light from the notches G. The quantity of light varies, depending on the presence or absence of the inclined notches G on the coin C. The determining device 19 determines the presence or absence of the inclined notches G on the coin C based on the quantity of light received by the light receiving sensor 14. Therefore, the presence or absence of the inclined notches G can be effectively determined with the simple configuration.

Since the light source 13 emits light from a direction perpendicular to the axis X of the coin C which is being transferred through the coin transfer path 12, the distance of the light receiving sensor 14 from the coin C with respect to the direction of the axis X can be minimized. Therefore, the space required for the light source 13 and the light receiving sensor 14 can be minimized.

This invention may be embodied in other forms or carried out in other ways without departing from the spirit thereof The present embodiments are therefore to be considered in all respects as illustrative and not limiting, the scope of the invention being indicated by the appended claims, and all modifications falling within the meaning and range of equivalency are intended to be embraced therein.

The invention claimed is:

1. A coin-type determining device for determining a presence or absence of inclined notches formed on the circumferential surface of a coin transferred through a coin transfer path, the inclined notches being inclined at a predetermined angle with respect to an axis of the coin, comprising:

a light emitting device for emitting the light onto the circumferential surface of the coin;

a light receiving device disposed in a direction of mirror reflection of light reflected from the inclined notch; and a determining device for determining the presence or absence of inclined notches based on the quantity of light received by the light receiving device.

2. A coin-type determining device according to claim 1, wherein the light emitting device emits the light onto the circumferential surface of the coin transferred through the coin transfer path through a light axis perpendicular to the axis of the coin.

3. A coin-type determining device according to claim 2, wherein the light receiving device is located at a position shifted from the coin in a direction parallel to said axis of the coin.

* * * * *